US009178631B2

(12) United States Patent
Cottrell et al.

(10) Patent No.: US 9,178,631 B2
(45) Date of Patent: Nov. 3, 2015

(54) ASYNCHRONOUSLY STREAMING HIGH QUALITY AUDIO OF A LIVE EVENT FROM A HANDHELD DEVICE

(71) Applicant: SPACEBAR, INC., San Francisco, CA (US)

(72) Inventors: Jonathan Cottrell, San Francisco, CA (US); Gregory Miller, San Francisco, CA (US); David Cottrell, San Francisco, CA (US); James Nash, San Francisco, CA (US)

(73) Assignee: SPACEBAR, INC., San Francisco, CA (US)

( * ) Notice: Subject to any disclaimer, the term of this patent is extended or adjusted under 35 U.S.C. 154(b) by 322 days.

(21) Appl. No.: 13/866,944

(22) Filed: Apr. 19, 2013

(65) Prior Publication Data

US 2014/0314237 A1 Oct. 23, 2014

(51) Int. Cl.
  *G06F 17/00* (2006.01)
  *H04H 60/02* (2008.01)
  *H04L 29/06* (2006.01)

(52) U.S. Cl.
  CPC ........... *H04H 60/02* (2013.01); *H04L 65/4076* (2013.01); *H04L 65/605* (2013.01)

(58) Field of Classification Search
  CPC . H04L 65/4076; H04L 65/605; H04L 1/1835; H04L 1/1874; H04L 2012/5681; H04H 60/02; G06F 17/40
  See application file for complete search history.

(56) References Cited

U.S. PATENT DOCUMENTS

| | | | |
|---|---|---|---|
| 7,756,595 B2 * | 7/2010 | Asada et al. | 700/94 |
| 2002/0103919 A1 * | 8/2002 | Hannaway | 709/231 |
| 2015/0046267 A1 * | 2/2015 | MacTiernan et al. | 705/14.66 |

OTHER PUBLICATIONS

Robehmed, "DIY Live-Streaming: the Future of Concerts?", Forbes, May 30, 2012, 2 pages, downloaded at: http://www.forbes.com/sites/natalierobehmed/2012/05/30/diy-live-streaming-the-futureof-concerts/.

Sisario, "Bands Improvise New Ways to Live-Stream Shows", New York Times, Apr. 8, 2012, 2 pages, downloaded at: http://www.nytimes.com/2012/04/09/business/media/bands-improvise-a-way-to-live-stream-shows.html.

(Continued)

*Primary Examiner* — Andrew C Flanders
(74) *Attorney, Agent, or Firm* — Nicholson De Vos Webster & Elliott LLP

(57) ABSTRACT

An audio streaming system includes a handheld computing device that asynchronously streams audio to a storage subsystem. The handheld computing device receives and buffers audio data of contiguous audio samples and, after a predefined amount of contiguous audio samples has been buffered, assigns an index for that predefined amount of contiguous audio samples and asynchronously transmits the index and those contiguous audio samples to a storage subsystem of a broadcast server system. The handheld computing device, upon determining that the predefined amount of contiguous audio samples has been received by the storage subsystem, transmits a notification message to an application server of the broadcast server system that includes the assigned index and indicates that the corresponding contiguous audio samples are stored on the storage subsystem. The notification message causes the application server to fetch those audio samples according to the index and process them for broadcasting to client computing devices.

20 Claims, 9 Drawing Sheets

(56) References Cited

OTHER PUBLICATIONS

Mattise, "Ryan Montbleau Band Brings Concerts to the Fans Through DIY Livestream", Gear & Gadgets/Product News & Reviews, Ars Technica, May 19, 2012, downloaded at: http://arstechnica.com/gadgets/2012/05/ryan-montbleau-band-brings-concerts-to-the-fansthrough-diy-livestream/.

Pantos et al., "HTTP Live Streaming—draft-pantos-http-live-streaming-11," Informational Internet-Draft, Apr. 16, 2013, 37 pages.

Leader, "Concert Window: Live Music in Your Home," Evolver.fm, published by the echonest, Oct. 17, 2012, 4 pages, downloaded at: http://evolver.fm/2012/10/17/concert-window-live-music-in-your-home/.

"Your Online Concert Venue," Stageit.com, 5 pages, downloaded on Apr. 19, 2013 at: http://www.stageit.com/site/what_is_stageit.

"Broadcast Anywhere," USTREAM, Inc., 4 pages, downloaded on Apr. 19, 2013 at: http://www.ustream.tv/platform.

"What is Skype? Online video calling, instant messaging, mobile chat," 2013 Skype and/or Microsoft, 3 pages, downloaded on Apr. 19, 2013 at: http://www.skype.com/en/what-is-skype/.

"Apple—iOS 6—FaceTime, the easiest way to call face-to-face," Apple Inc., downloaded on Apr. 19, 2013 at: http://www.apple.com/ios/facetime/.

"Spacebar Helps Musicians," Spacebar, Inc., 6 pages, downloaded on Apr. 18, 2013 at: http://spacebar.fm/helpingmusicians.html.

"Spacebar—About," Spacebar, Inc., 2 pages, downloaded Apr. 18, 2013 at: http://spacebar.fm/about.html.

* cited by examiner

ASYNCHRONOUSLY STREAMING HIGH QUALITY AUDIO OF A LIVE EVENT FROM A HANDHELD DEVICE

FIELD

Embodiments of the invention relate to the field of computer and audio processing; and more specifically to asynchronously streaming high quality audio of a live event from a handheld device.

BACKGROUND

Audio is commonly streamed over the Internet using synchronous streaming protocols such as Real Time Messaging Protocol (RTMP) or Real Time Streaming Protocol (RTSP). These streaming protocols work well in consistent and predictable network environments, but are less robust and reliable if the network is not reliable. For example, cellular networks are often unreliable and connection breakages occur frequently. Recovering from a connection breakage using these synchronous steaming protocols can be difficult and sometimes impossible. Moreover, even if you can recover, usually there is a loss of data, especially if the audio is being streamed from a live event.

It is also difficult, and sometimes impossible, to detect successful audio transfer to the broadcast server and/or to calculate latency between the streaming device and the broadcast server. Because of this, it is difficult and sometimes impossible to dynamically change the bit rate of the stream in cases network congestion.

In addition, these synchronous streaming protocols also do not scale well because once a connection is established between the streaming device and the broadcast server, that same connection needs to be maintained and there can be no subsequent load balancing or switching without breaking that connection.

There are techniques for streaming audio from a live event or performance, which typically do not use a handheld device to capture and stream the audio. Also, these techniques typically only support low quality audio and are susceptible to having packets dropped (they do not support contiguous audio delivery).

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
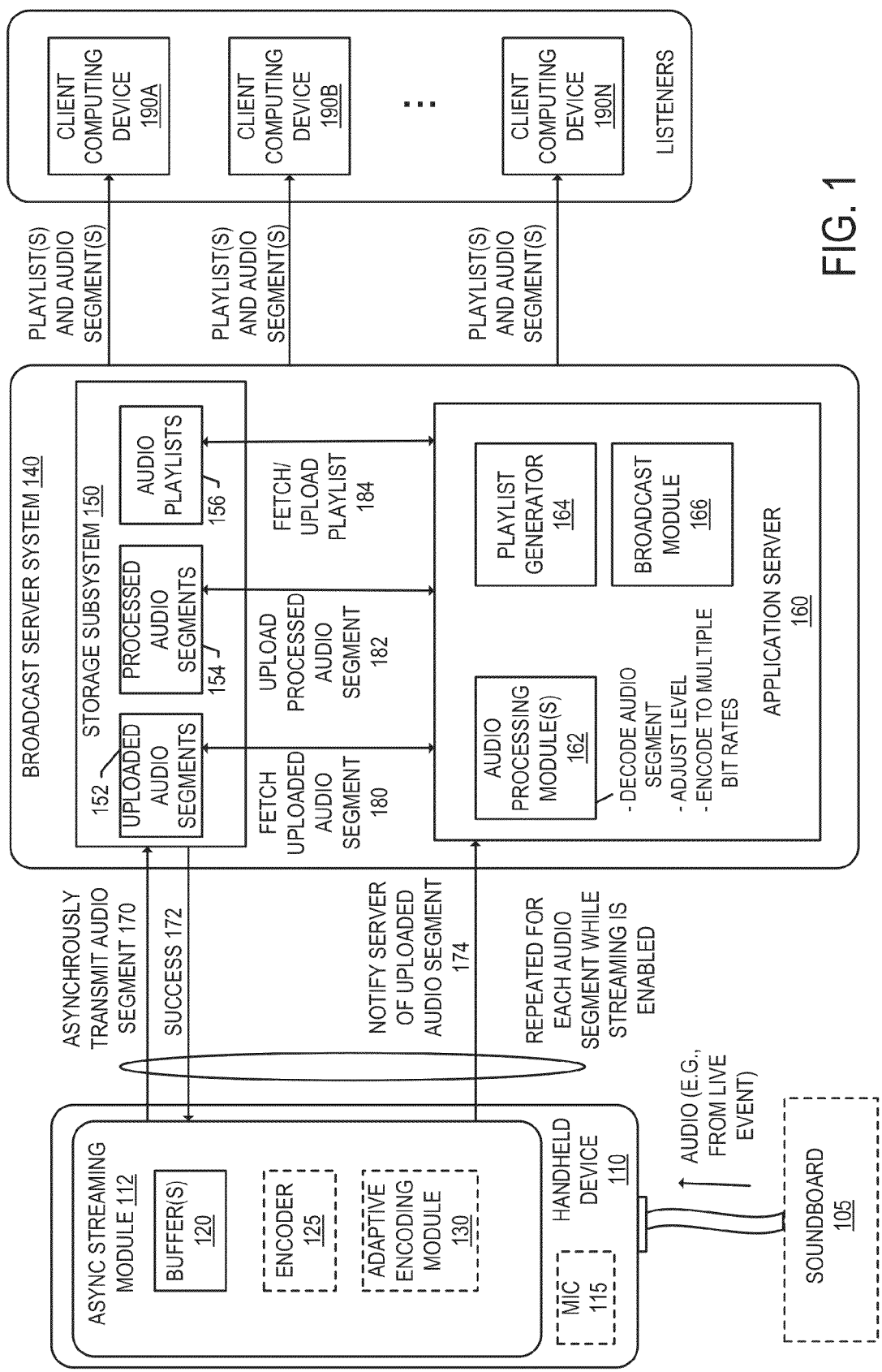
FIG. 1 is a block diagram that illustrates an exemplary system for streaming high quality and contiguous audio captured by a handheld device to multiple end user (e.g., listener) computing devices according to one embodiment.

A method and apparatus for streaming high quality audio of a live event or performance asynchronously from a handheld computing device to a broadcast server system for broadcasting the audio to multiple client computing devices is described. FIG. 1 is a block diagram that illustrates an exemplary system for streaming high quality and contiguous audio captured by a handheld device to multiple end user (e.g., listener) computing devices according to one embodiment. The handheld device 110 is a form of a computing device that has a relatively small form factor such as a smartphone, mobile phone, portable media player, personal data assistant (PDA), tablet, etc. The handheld device 110 is configured to capture live audio, such as in a live event (e.g., a concert, a variety show, a comedy show, etc.).

The handheld device 110 includes the asynchronous streaming module 112 that is configured to asynchronously transmit high quality and contiguous audio data (that the handheld device 110 captures) to the broadcast server system 140. The handheld device 110 may be put into an asynchronous streaming mode through use of a graphical user interface to the asynchronous streaming module 112; an example of which will be described in relation to FIGS. 5 and 6 later herein. The handheld device 110 may be configured to capture the live audio in different ways in different embodiments. In one embodiment, the handheld device 110 is connected directly to the soundboard 105 (sometimes referred to as a mixing console) at the venue to capture the live, high quality, audio flowing through the soundboard 105. The handheld device 110 may be connected to the soundboard 105 via a line input jack or through an external analog-to-digital converter that interfaces the soundboard 105 and the handheld device 110. The handheld device 110 may request the audio from the soundboard 105 60 times per second, which is used for visual feedback of the signal. If the soundboard 105 outputs analog signals, the handheld device 110 may perform analog-to-digital conversion of the audio. In another embodiment, the handheld device 110 captures the live audio through a microphone (e.g., such as the integrated microphone 115 or through a microphone attached to the handheld device). In another embodiment, the handheld device 110 may capture the live audio via a wireless receiver that is being transmitted from a corresponding wireless transmitter. In an embodiment, one or more of these techniques may be used simultaneously.

The captured audio data is appended to the buffer(s) 120. The buffer(s) 120 may each be a first-in-first-out (FIFO) queue. In one embodiment, the buffer(s) 120 include a buffer of raw or unprocessed audio (the audio data that is captured by the handheld device 110) and a buffer for processed audio in embodiments where the handheld device 110 processes the captured audio data. For example, in some embodiments, the handheld device 110 includes the encoder 125 which encodes the captured audio data in a compressed format. The encoding may be in a lossy format (e.g., MPEG-2 Audio Layer III) or a lossless format (e.g., Apple Lossless Audio Codec (ALAC), MPEG-4 Audio Losses Coding, etc.). The encoding method used may be based on the processing power of the handheld device 110. The encoding format and configuration parameters may depend on the network conditions and/or the network connection from the handheld device 110 to the storage system 140. For example, if the network connection is relatively slow (e.g., 2G, 3G, etc.), then the audio will be compressed more than if the network connection is relatively fast (e.g., WiFi). In one embodiment, the encoding of the audio is performed by a background execution thread of the asynchronous streaming module 112.

After a predetermined amount of audio data has been captured and appended a buffer in the buffer(s) 120, the asynchronous streaming module 112 processes that predetermined amount of audio data. By way of a specific example, the handheld device 110 may be configured to capture 44,100 samples of audio per second at 16 bits per sample for each of two channels (left and right) in the raw linear pulse-code modulation (PCM) format, which is stereo compact disc (CD) quality audio, and the predetermined amount of audio data may be ten seconds of this quality audio data (e.g., 441,000 audio samples for each channel for a total of 882,000 samples). The handheld device 110 may be configured to capture the audio in stereo when receiving the audio through the soundboard 105. In cases where the handheld device 110 is capturing monaural sound (a single channel), such as if the handheld device 110 is recording audio through the microphone 115, the handheld device 110 may be configured to capture 44,100 samples of audio per second at 16 bits per sample for the single channel in the raw linear PCM format.

The amount of predetermined audio data is referred herein as a segment of audio or audio segment. Processing the audio segment includes assigning an index to the audio segment that identifies that audio data segment. The index is unique to the streaming audio session such that two audio segments in the same streaming audio session will not share an index value. For example, each subsequent audio data segment in that streaming audio session will be assigned an incremented index value. In some embodiments the index is also unique across streaming audio sessions; however in some embodiments the index may not be guaranteed to be unique across streaming audio sessions. Processing the audio data may also include encoding the data as described above. As another example, processing the audio data may also include compressing the audio data (separate and possibly in addition to encoding the audio data). If the microphone is used to capture audio, processing the audio data may also include denoising processing to remove some of the noise that will inherently be included in the audio data. As yet another example, processing the audio data may also include limiting the volume of the audio to a predefined level.

Sometime after the audio segment is processed, the audio segment is transmitted to the broadcast server system 140 at operation 170. The asynchronous streaming module 112 typically transmits the audio data to the broadcast server system 140 using a wireless connection (e.g., WiFi, 2G, 3G, Worldwide Interoperability for Microwave Access (WiMAX), Long Term Evolution (LTE), etc.). The connection that is used is typically determined by the handheld device 110 and is usually the best connection (e.g., fastest) connection at that time, which potentially can change during the streaming audio session. However, in some embodiments, the asynchronous streaming module 112 may transmit the audio data using a wired connection. The transmission of the audio segment is asynchronous because it does not take place in real time (e.g., the audio is transmitted in periodic audio segments). By way of example, the asynchronous streaming module 112 establishes a connection with the storage subsystem 150 of the broadcast server system 140 and transmits the audio segment using a Hypertext Transfer Protocol (HTTP) POST request. In one embodiment, this HTTP POST request is transmitted over a secure connection (e.g., HTTPS). In one embodiment, the connection is established only when the audio segment is ready to be transmitted and is used only for a single audio segment. To say it another way, a different connection is established between the asynchronous streaming module 112 and the storage subsystem 150 for each different audio segment being transmitted during the streaming audio session. The audio segment transmitted to the storage subsystem 150 includes the index that identifies that audio segment. The audio segment transmitted to the storage subsystem 150 may also include an identifier that identifies the streaming audio session that is common across all of the audio segments transmitted during the streaming audio session. For example, if a live event or performance is being streamed, this identifier may be the name of the live event or performance or other identifier that uniquely identifies the live event or performance.

The storage subsystem 150 stores the uploaded audio segments 152. In one embodiment, the storage subsystem 150 transmits a success acknowledgement message to the asynchronous streaming module 112 at operation 172 that indicates that the audio segment has been successfully uploaded to the storage subsystem 150. If the asynchronous streaming module 112 does not receive such an acknowledgement message in a certain amount of time, or it otherwise has detected a network failure during the upload or other upload failure, the asynchronous module 112 retries the upload (potentially to a different physical machine of the storage subsystem 150). Since the audio segment is identified with an index, the asynchronous streaming module 112 can keep track of what audio data has been received by the storage subsystem 150. In this way, the transmission of contiguous audio samples is supported.

In one embodiment, the storage subsystem 150 also notifies the application server 160 that an audio segment has been successfully uploaded to the storage subsystem 150. As will be described in more detail later herein, the storage subsystem 150 also stores processed audio segments 154 and audio playlists 156. An audio playlist specifies the location of audio segments and the order in which they are to be played. For example, in one embodiment, the audio playlist is in the M3U8 format. In one embodiment, the storage subsystem 150 stores the audio segments and audio playlists in a flat file format that allows for caching, deduplication of files, and distribution across other storage subsystems (which may be located in different geographical regions in order to place the audio segments and audio playlists closer to certain listeners).

The storage subsystem 150 is coupled with the application server 160. Generally speaking, the storage subsystem 150 stores the audio segments and audio playlists and the application server 160 processes the audio segments (e.g., decoding the audio segments, adjusting the level, encoding the audio to multiple bit rates that are suitable for different end user network connections, etc.), generating or updating the audio playlists of the audio segments, as well as providing an interface for the listeners to locate and listen to the audio. While in one embodiment the storage subsystem 150 and application server 160 are physically located on separate devices, in other embodiments at least some of the functionality of either the storage subsystem 150 or the application server 160 reside on the same physical device.

In one embodiment, the asynchronous streaming module 112 is configured to adapt to changing network conditions (e.g., increase in network traffic, decrease in network traffic) using an adaptive algorithm to adjust buffering and data encoding, while retaining contiguous audio sample integrity. At a live event, it is common for network traffic to sporadically increase (often unpredictably) as a result of users using their handheld devices to place audio and/or video calls, taking and transmitting pictures, using social media applications, etc. This spike in network traffic can adversely affect the network connection of the handheld device (e.g., slow down the connection from the handheld device 110 to the broadcast server system 140).

The asynchronous streaming module 112 includes the adaptive encoding module 130 that tracks the upload times of audio segments to the broadcast server system 140 and adjusts the encoding accordingly. For example, if the upload time exceeds a threshold, the adaptive encoding module 130 causes the encoding to be adjusted to lower the bit rate (e.g., by increasing the compression rate, selecting a different encoding method that results in a lower bit rate) to reduce the file size of future audio segments in an attempt to lower the upload time of future audio segments. If the upload time is below a certain threshold, the adaptive encoding module 130 causes the encoding to be adjusted to increase the bit rate (e.g., by decreasing the compression rate, selecting a different encoding method that results in a higher bit rate, removing any compression involved with encoding to transmit the raw audio data) to increase the file size (and quality) of future audio segments. It should be understood that although the quality of the audio may change depending on changing network conditions, contiguous audio is transmitted to the broadcast server system 140.

In one embodiment, prior to receiving the audio data or prior to transmitting the first audio segment, the asynchronous streaming module 112 uploads a test audio segment to the broadcast server system 140 to determine the capabilities of the network. Based on the result, a default (or starting) encoding method is selected and used for the audio segments. For example, if the test indicates that bandwidth is relatively limited, then an encoding method that produces a relatively large amount of compression is selected. Similarly, if the test indicates that bandwidth is relatively high, then an encoding method with a relatively small amount of compression is selected (which increase the quality of the audio).

The asynchronous streaming module 112 transmits a notification message to the application server 160 that indicates that the audio segment was successfully uploaded to the storage subsystem 150 at operation 174. The notification message may also include the index assigned to that particular audio segment. The notification message may also include the streaming audio session identifier that identifies the streaming audio session. In one embodiment, this notification message is sent using an HTTP POST request to the application server 160.

It should be understood that the operations 170, 172, and 174 are performed on a regular periodic basis (e.g., starting once every ten seconds) while streaming is enabled on the handheld device 110.

Since in some embodiments the handheld device 110 is streaming audio from a live event, the application server 160 processes the audio data and causes the audio data and audio playlist to be streamed to the end user listeners shortly after receiving the notification message transmitted in operation 174. In this sense, the notification message acts as a trigger launch the processing performed by the application server 160. To say it another way, the notification message is configured to cause the application server 160 to fetch the audio segment identified through the notification message and process that audio segment for streaming to the client devices 190A-N.

The application server 160 includes one or more audio processing modules 162 that process the audio segments. For example, upon receipt of the notification message, the audio segment that was uploaded to the storage subsystem 140 is fetched 180 by the application server 160. The application server 160 uses the index included in the notification message (and potentially the streaming audio session identifier) to fetch that audio segment from the storage subsystem 140. The audio processing module(s) 162 then process that audio segment. Example processing includes decoding the audio segment, adjusting the audio level of the audio segment, and encoding the audio segment for listener/client playback.

The audio level of the audio segment may be adjusted to increase the audio level if it is not loud enough, decrease the audio level if it is too loud, and/or to make the audio level consistent across different events or shows. The audio segment may be encoded into different bit rates and/or file formats in order to compensate for different connection speeds of the end user client devices (client devices that have a slower network connection will receive more compressed audio than client devices with a faster network connection) and different client devices (some client devices may require a specific file format).

After processing an audio segment, the application server 160 uploads 182 the processed audio segment to the storage subsystem 150. The processed audio segment (which may now be in multiple versions) is stored in the processed audio segments 154. The application server 160 also creates or updates one or more playlist for the processed audio segment. For example, the playlist generator 164 fetches the playlist for the streaming audio session (if one already exists) and updates the playlist to include the location of the processed audio segment and the order in which it should be played. For each different audio segment version, there may be a different audio playlist.

The listeners at the client computing devices 190A-N may locate shows and access the live audio (in relatively real time) through use of the broadcast module 166. In one embodiment, the broadcast module 166 provides a web interface for the end users and/or the back-end of an application installed on the client computing devices 190A-N for listening to streaming audio in accordance with embodiments described herein. After the playlist(s) have been generated or updated, listeners at the client computing devices 190A-N download the playlist(s) and audio segment(s) indicated by the playlist(s) and begin to play the audio for their selected show. The client computing devices 190A-N will periodically check for an updated playlist and download it if there has been an update. In one embodiment, the HTTP Live Streaming protocol is used by the broadcast server system 140 to stream the processed audio segments to the client computing devices 190A-N.

Figure 2:
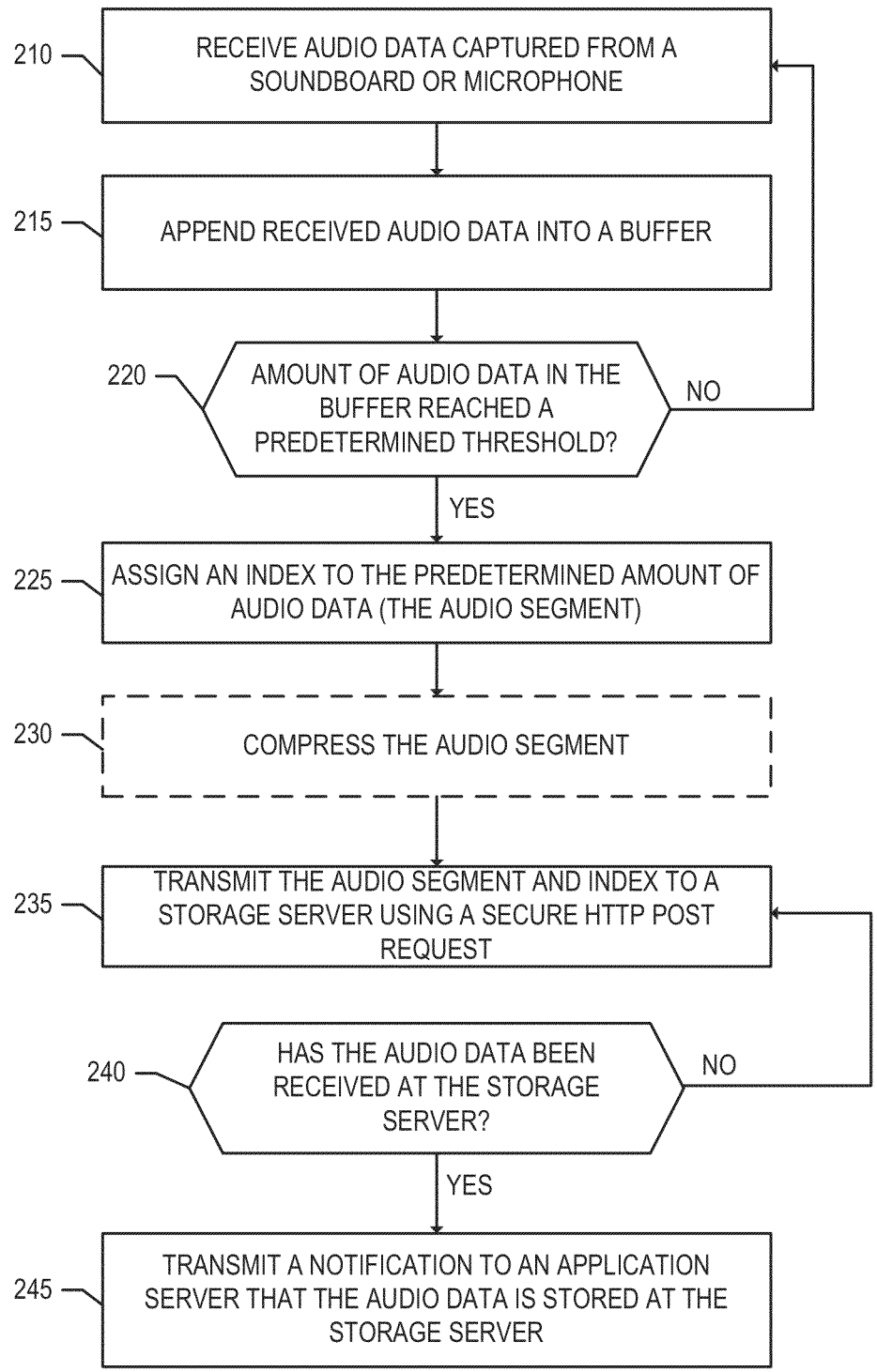
FIG. 2 is a flow diagram that illustrates exemplary operations performed on a handheld computing device for asynchronously streaming high quality audio to a broadcast server system according to one embodiment.

FIG. 2 is a flow diagram that illustrates exemplary operations performed on a handheld computing device for asynchronously streaming high quality audio to a broadcast server system according to one embodiment. The operations of FIG. 2 will be described with reference to the exemplary embodiment of FIG. 1. However, it should be understood that the operations of FIG. 2 can be performed by embodiments other than those discussed with reference to FIG. 1, and the embodiments discussed with reference to FIG. 1 can perform operations different than those discussed with reference to FIG. 2.

At operation 210, the handheld device 110 receives audio data. The received audio may be from a live show or event, or it may be from a recorded show or event that is being played back. As previously described, the handheld device 110 may receive the audio directly through the soundboard 105 and/or through a microphone (such as the integrated microphone 115 or a microphone connected to the handheld device 110). Flow moves from operation 210 to operation 215.

At operation 215, the asynchronous streaming module 112 appends the data to one of the buffer(s) 120. In one embodiment, the size of this buffer (the amount of audio that it can store) is such that it will store several seconds of high quality audio. By way of a specific example, if the handheld device 110 is sampling the audio at 44.1 kHz at 16 bits per second (compact disc (CD) quality audio), the buffer 120 may store up to ten seconds of audio (441,000 samples). Of course, the amount of data that can be stored in the buffer may be different in different embodiments. Flow moves from operation 215 to operation 220.

At operation 220, the asynchronous streaming module 112 determines whether the amount of data in the buffer has reached a predetermined threshold. For example, in one embodiment, the asynchronous streaming module 112 determines whether the buffer is full. By way of a specific example, the predetermined threshold is set such that there will need to be several seconds of high quality audio stored in the buffer to meet the threshold (e.g., ten seconds of audio (441,000 samples if sampling at 44.1 kHz at 16 bits per second, which is compact disc (CD) quality audio). If the predetermined threshold is met, then flow moves to operation 225, otherwise flow moves back to operation 210.

At operation 225, the handheld device 110 assigns an index to the predetermined amount of audio data in the buffer (the segment of audio). Flow then moves to operation 230. Although not illustrated in FIG. 2, the handheld device 110 may also perform additional processing such as limiting the volume of the audio and/or performing denoising to remove some of the noise included in the audio data (e.g., if the microphone is used to capture the audio data).

At operation 230, which is optional in some embodiments, the handheld device 110 compresses the segment of audio. For example, the encoder 125 encodes the audio in a compressed format. The encoding may be in a lossy format (e.g., MPEG-2 Audio Layer III) or a lossless format (e.g., Apple Lossless Audio Codec (ALAC), MPEG-4 Audio Losses Coding, etc.). The encoding method used may be based on the processing power of the handheld device 110. The encoding format and configuration parameters may depend on the network conditions and/or the network connection from the handheld device 110 to the broadcast server system 140. For example, if the network connection is relatively slow (e.g., 2G, 3G, etc.), then the audio will be compressed more than if the network connection is relatively fast (e.g., WiFi). In one embodiment, the encoding of the audio segment is performed by a background execution thread of the asynchronous streaming module 112. Flow moves from operation 230 to operation 235.

At operation 235, the asynchronous streaming module 112 transmits the audio data segment and the corresponding assigned index to the storage subsystem 150 using a HTTP POST request. In one embodiment, this HTTP POST request is transmitted over a secure connection (e.g., HTTPS). The asynchronous streaming module 112 may also transmit a streaming audio session identifier to the storage subsystem 150. Flow moves from operation 235 to operation 240.

At operation 240, the asynchronous streaming module 112 determines whether the audio data segment has been received at the storage subsystem 150. In one embodiment, the storage subsystem 150 transmits an acknowledgement message when uploading of the audio data segment is complete. The asynchronous streaming module 112 also can detect a network failure during the upload or otherwise know that the upload failed. If the audio data has been determined to have been received at the storage subsystem 150, then flow moves to operation 245, otherwise flow moves back to operation 235 and the asynchronous streaming module 112 retries transmitting the audio data segment to the storage subsystem 150. In one embodiment, the asynchronous streaming module 112 stores the processed audio segment into one of the buffer(s) 120 for retransmission (if needed). The asynchronous streaming module 112 may remove the processed audio segment from the buffer (or set it as eligible for being written over) once an acknowledgement message has been received that indicates that the upload of the audio segment was successful.

At operation 245, the asynchronous streaming module 112 transmits a notification to the application server 160 that indicates that the audio data segment is stored at the storage subsystem 150. This notification may be sent using an HTTP POST request, which may be over a secure connection such as HTTPS. The notification message may also include the index assigned to that particular audio segment. The notification message may also include the streaming audio session identifier that identifies the streaming audio session.

The operations described in FIG. 2 will be performed for each segment of audio data received by the handheld device 110. In some embodiments, a different connection and HTTP POST request is used to transmit each different audio data segment to the storage subsystem 150. Since each audio data segment is transmitted through a different HTTP POST request, the uploading of the audio data is more resilient for unreliable connections that are commonly found on handheld devices. For example, as previously described, connection breakages are difficult, or impossible, to recover from using traditional synchronous streaming protocols, and do not guarantee contiguous audio samples in case of a breakage. Moreover, since each audio data segment is transmitted on a different connection, the audio data segment may transmit the audio data segment to different server, which may allow for load balancing and is also robust to hardware or software failures of a particular server.

Although not illustrated in FIG. 2, in some embodiments the asynchronous streaming module 112 maintains statistics regarding the network connection and upload time of the audio data segment. The asynchronous streaming module 112 may use these statistics to adjust the encoding of future audio data segments (e.g., increase the compression, decrease the compression, or remove compression).

Figure 3:
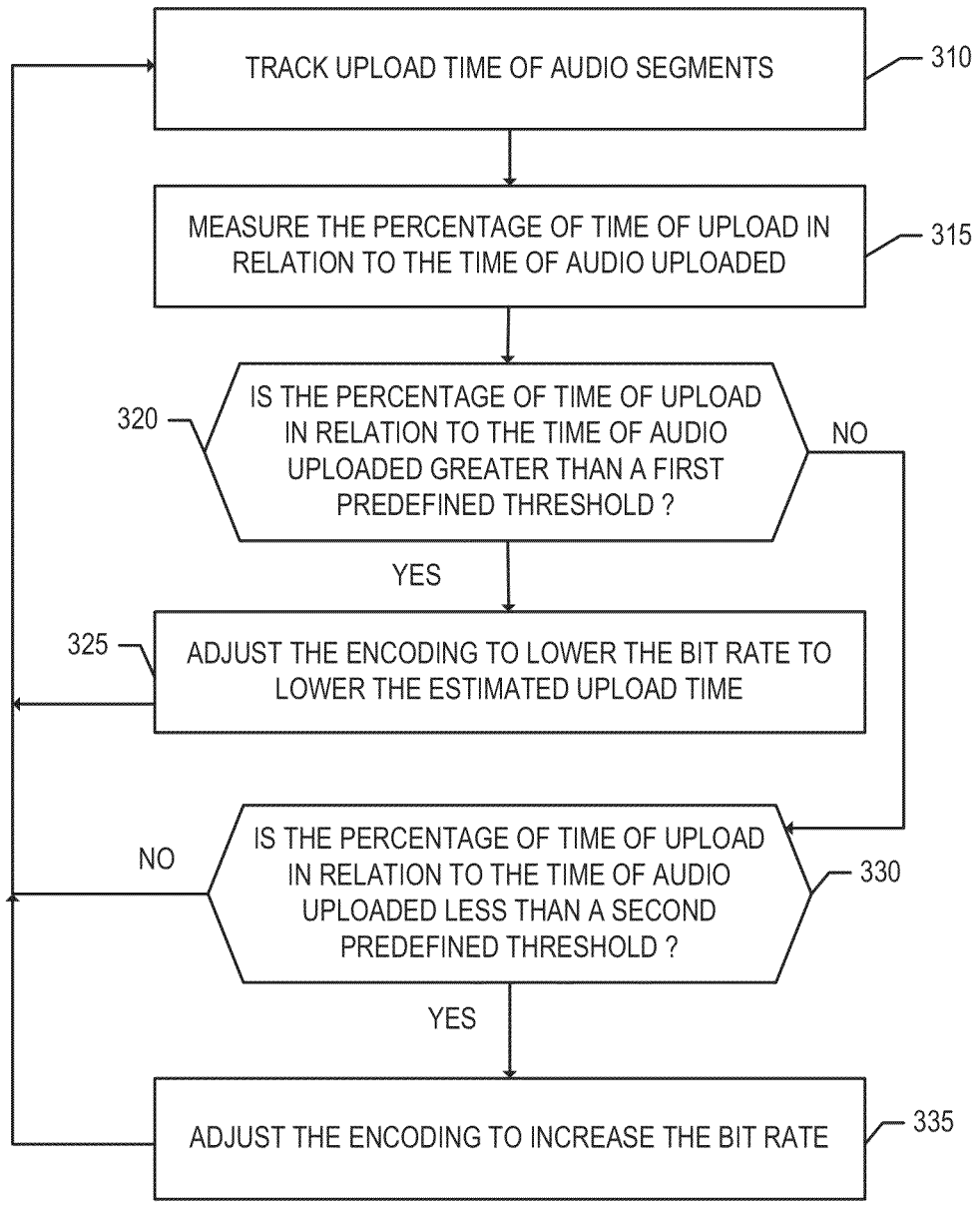
FIG. 3 is a flow diagram that illustrates exemplary operations for adjusting the encoding of the audio data based on the upload time of audio segments according to one embodiment.

FIG. 3 is a flow diagram that illustrates exemplary operations for adjusting the encoding of the audio data based on the upload time of audio segments according to one embodiment. For example, in one embodiment, if the amount of time uploading the audio data exceeds the length (in terms of time) of the audio data being uploaded, the handheld device adjusts the encoding such that the file size of the audio segment being uploaded is reduced (e.g., by increasing the compression rate). The operations of FIG. 3 will be described with reference to the exemplary embodiment of FIG. 1. However, it should be understood that the operations of FIG. 3 can be performed by embodiments other than those discussed with reference to FIG. 1, and the embodiments discussed with reference to FIG. 1 can perform operations different than those discussed with reference to FIG. 3.

At operation 310, the adaptive encoding module 130 tracks the upload times of audio segments to the storage subsystem 150. Next, flow moves to operation 315 and the adaptive encoding module 130 measures the percentage of time of upload in relation to the time of audio uploaded. Flow then moves to operation 320, where the adaptive encoding module 130 determines whether the percentage of time of upload in relation to the time of audio uploaded is greater than a first predefined threshold. By way of example, this first predefined threshold is set at a percentage between 50 percent to 80 percent. If the percentage is greater than the first predefined threshold, then flow moves to operation 325 where the adaptive encoding module 130 adjusts the encoding to lower the bit rate (e.g., increase the compression rate, selecting a different encoding method that results in a lower bit rate) to lower the estimated upload time. Flow moves from operation 325 back to operation 310.

If the percentage is not greater than the first predefined threshold, then flow moves to operation 330, where the adaptive encoding module 130 determines whether the percentage of time of upload in relation to the time of audio uploaded is less than a second predefined threshold. By way of example, this second predefined threshold is set at a percentage between 5 percent to 25 percent. If the percentage is less than the second predefined threshold, then flow moves to operation 335 where the adaptive encoding module 130 adjusts the encoding to increase the bit rate (e.g., reducing the compression, selecting a different encoding method that results in an increased bit rate, removing all encoding, etc.). If the percentage is not less than the second predefined threshold, then flow moves back to operation 310. Flow also moves from operation 335 back to operation 310.

Figure 4:
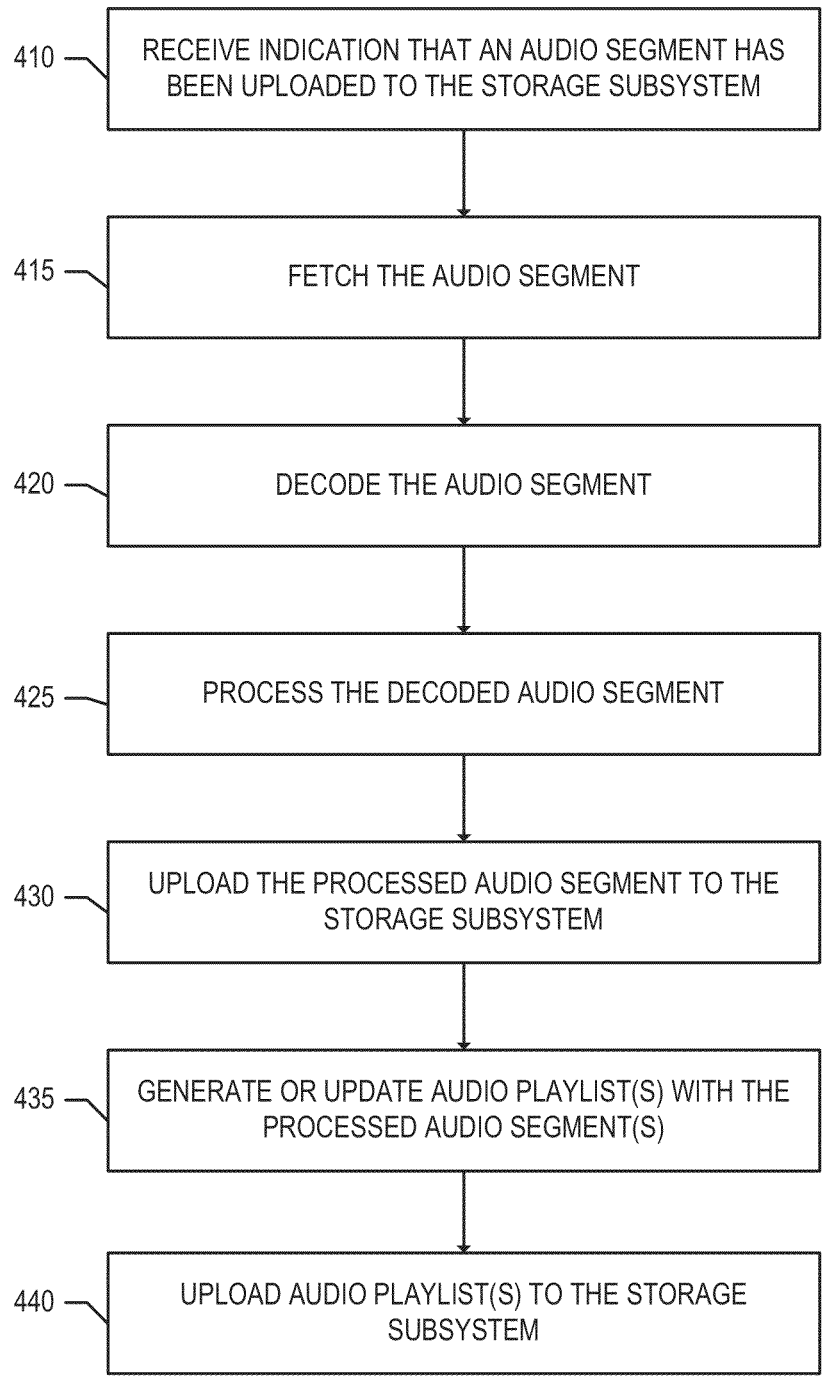
FIG. 4 is a flow diagram that illustrates exemplary operations performed on a broadcast server system for streaming audio segments received from a handheld device according to one embodiment.

FIG. 4 is a flow diagram that illustrates exemplary operations performed on a broadcast server system for streaming audio segments received from a handheld device according to one embodiment. The operations of FIG. 4 will be described with reference to the exemplary embodiment of FIG. 1. However, it should be understood that the operations of FIG. 4 can be performed by embodiments other than those discussed with reference to FIG. 1, and the embodiments discussed with reference to FIG. 1 can perform operations different than those discussed with reference to FIG. 4.

At operation 410, the application server 160 receives an indication that an audio segment has been uploaded to the storage subsystem 150. For example, the application server 160 may receive this indication from the asynchronous streaming module 112 of the handheld device 110 and/or from the storage subsystem 150. As a specific example, the application server 160 receives a notification message from the handheld device 110 that includes an index value and indicates that an audio segment corresponding to the index value was successfully uploaded to the storage subsystem. The notification message may also include a streaming audio session identifier that identifies the streaming audio session in which the audio segment was generated. This audio segment may be in its raw audio form or may be encoded in a compressed format. Flow then moves to operation 415.

At operation 415, the application server 160 fetches the audio segment from the storage subsystem 150. Flow then moves to operation 420 where the application server 160 decodes the fetched audio segment. Next, at operation 425, the application server 160 encodes the decoded audio segment one or more times for listener playback. The encoding may be done multiple times, resulting in multiple encoded versions of the audio segment, to account for differences in the network connections of the client computing devices and/or processing capabilities of the client computing devices. By way of example, the audio segment may be encoded multiple times each having a different bit rate. Flow then moves to operation 430.

Although not illustrated, the application server 160 may also perform additional processing on the decoded audio segment including adjusting the level of the audio segment. The level of the audio segment may be increased to increase the volume for the listeners. The level of the audio segment may also be adjusted so that the volume is consistent across different shows.

At operation 430, the application server 160 uploads the processed audio segment to the storage subsystem 150. Flow then moves to operation 435 where the application server 160 generates or updates one or more audio playlists (e.g., a separate audio playlist for each audio segment version) and then flow moves to operation 440 where the application server 160 uploads the audio playlist(s) to the storage subsystem 150.

Figure 5:
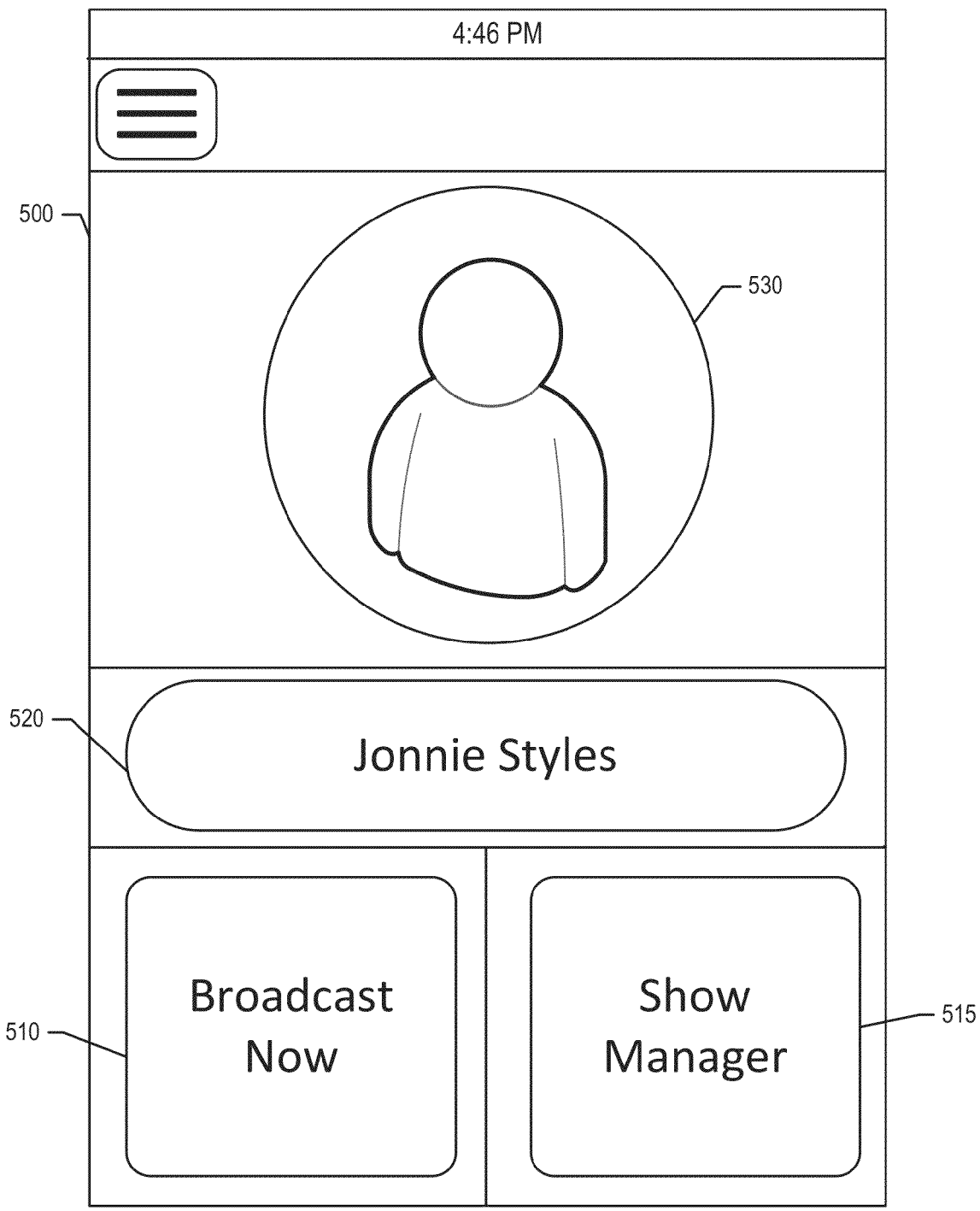
FIG. 5 illustrates an exemplary screen of a user interface for streaming audio captured from a handheld device according to one embodiment.

FIG. 5 illustrates an exemplary screen of a user interface for streaming audio captured from a handheld device according to one embodiment. The screen 500 is part of the interface to the asynchronous streaming module 112 according to one embodiment. The "Broadcast Now" button 510, when selected, causes the asynchronous streaming module 112 to begin capturing audio and asynchronously streaming audio segments as previously described herein. In the example illustrated in FIG. 5, the audio is being streamed from a show of Jonnie Styles as indicated by the show title 520. An image of Jonnie Styles or other image selected by the artist is shown in element 530. The "Show Manager" button 515, when selected, allows scheduling information about the show to be entered (e.g., biographical data of the artist, venue, etc.), and may also allow the band or artist to request to perform at a venue and/or accept an incoming show request from a venue or other artist.

Figure 6:
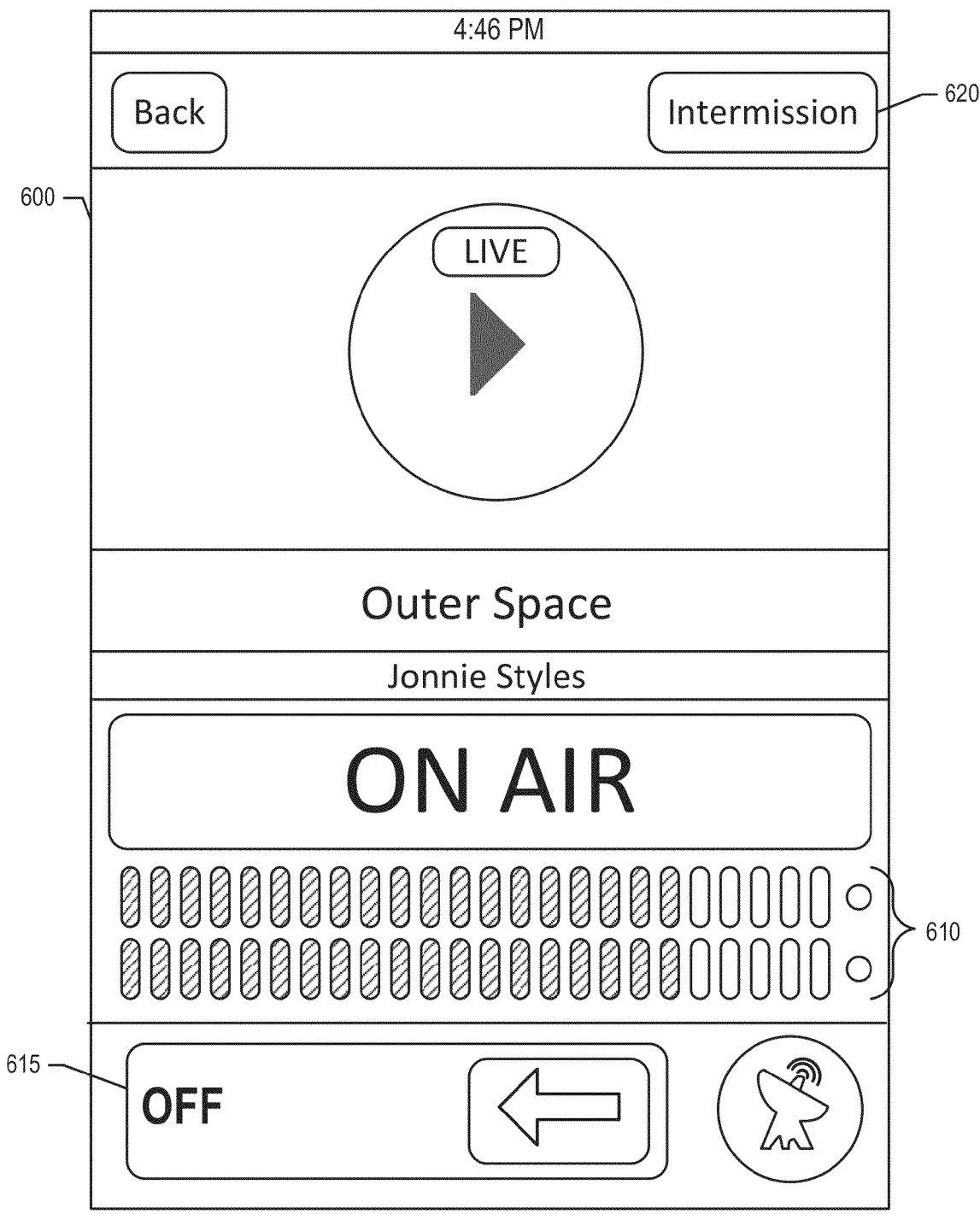
FIG. 6 illustrates an exemplary screen of a user interface of the asynchronous streaming module that is shown while asynchronous streaming is ongoing according to one embodiment.

FIG. 6 illustrates an exemplary screen of a user interface of the asynchronous streaming module 112 that is shown while asynchronous streaming is ongoing according to one embodiment. The screen 600 is shown after the "Broadcast Now" button 510, illustrated in FIG. 5 has been selected. The level indicator lights 610 indicate the audio levels of the audio segments being streamed asynchronously to the storage subsystem 150. The slide action 615, if selected to the "off" position, stops the audio streaming. In one embodiment, stopping the audio streaming causes any remaining audio data in the buffer(s) 120 that has not been successfully transmitted to the storage subsystem 150 to be transmitted to the storage subsystem 150.

Figure 7:
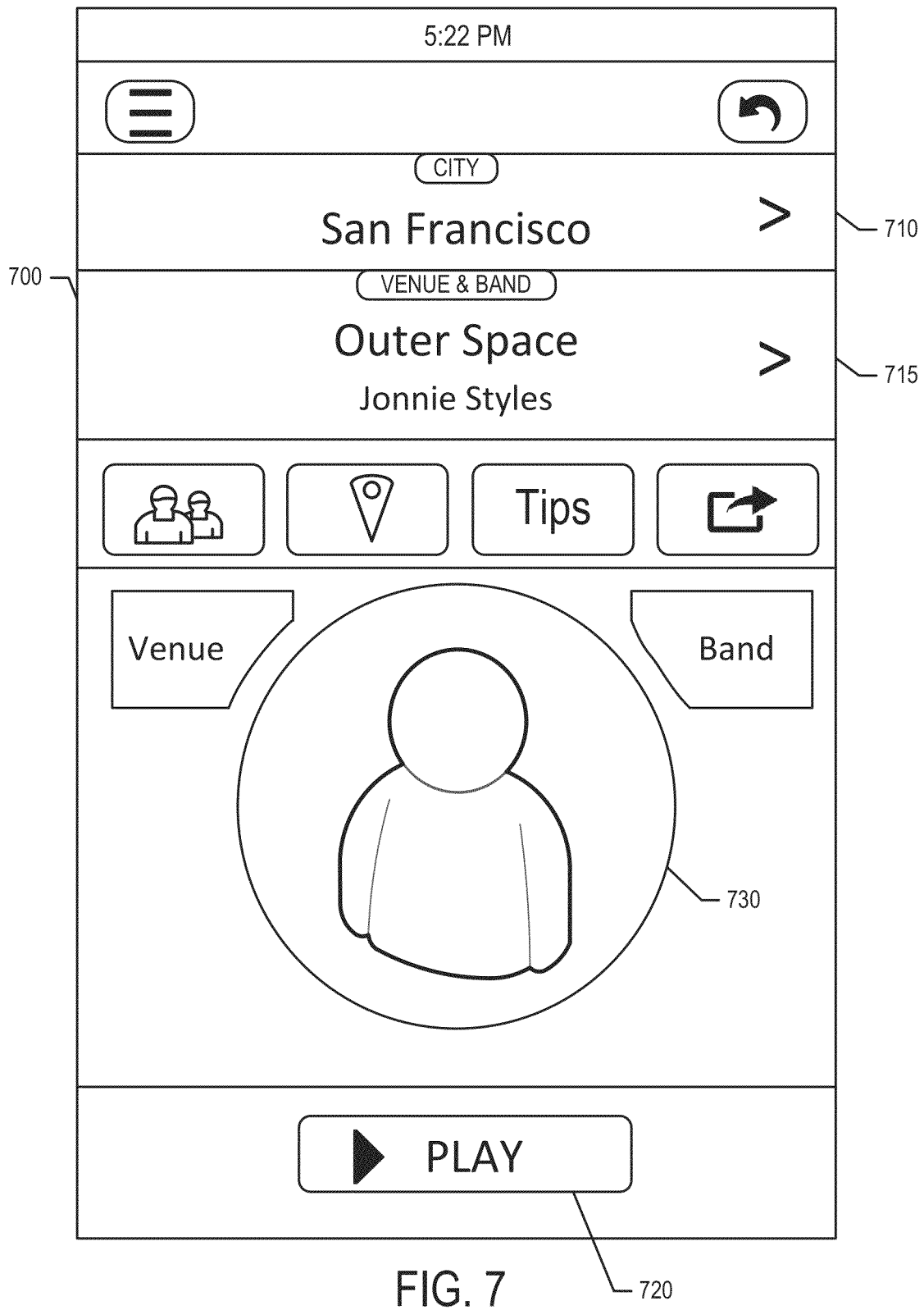
FIG. 7 illustrates an exemplary screen of a user interface for listeners to find and listen to streaming audio according to one embodiment.
Figure 8:
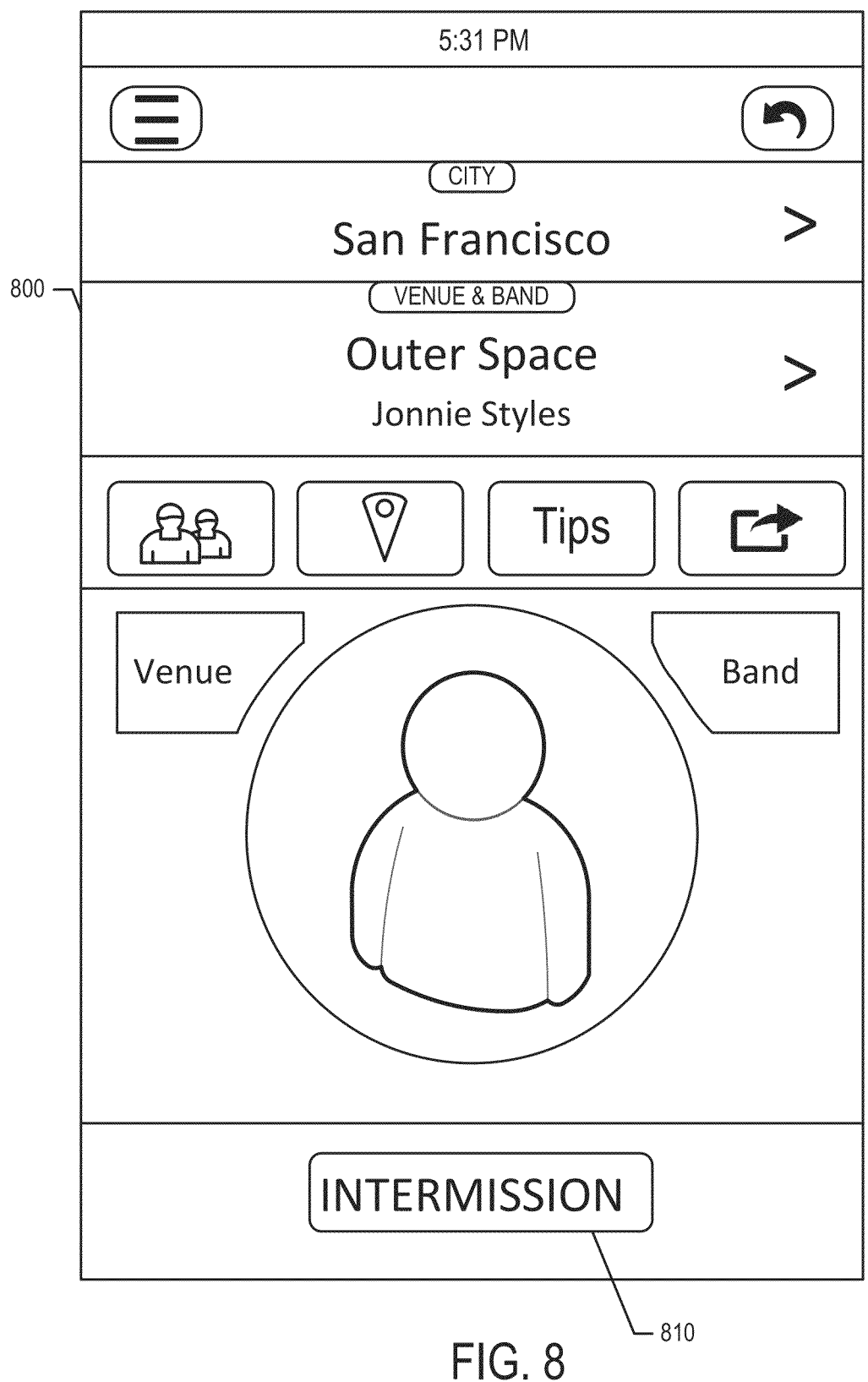
FIG. 8 illustrates an exemplary screen of the user interface that is displayed to a listener when a show is in intermission and audio is not streaming according to one embodiment.

FIG. 7 illustrates an exemplary screen of a user interface for listeners to find and listen to streaming audio according to one embodiment. The screen 700 is part of an application of a client computing device such as the client computing devices 190A-N. The screen 700 is part of the interface to the broadcast module 166 according to one embodiment. The screen 700 includes the city selector 710 to allow the user to select and scroll through cities in which shows are being held. The venue and band selector 715 allows the user to scroll and select the venue and band that are having shows. In the example illustrated in FIG. 7, the band Jonnie Styles is playing in the venue Outer Space in San Francisco and the image selected by the band is shown in element 730. The user selects the play button 720 to begin listening to the selected show. Although not shown, in some embodiments, the user may also select an audio format and bit rate. In some embodiments, the bit rate is selected for the user depending on the network connection of the client computing device. FIG. 8 illustrates an exemplary screen of the user interface that is displayed to a listener when a show is in intermission and audio is not streaming according to one embodiment. As illustrated in FIG. 8, the interface 800, indicates 810 that the show referenced in FIG. 7 is in intermission.

While embodiments have been described herein with respect to a handheld device capturing audio and asynchronously transmitting the audio to the broadcast server system, in other embodiments a computing device with a larger form factor such as a laptop may be used to capture audio and asynchronously transmit the audio to the broadcast server system.

While embodiments have been described in relation to streaming audio from a handheld device, the techniques described above may also be used to stream video from a handheld device. For example, the handheld device may also capture video data (e.g., through an integrated camera or attached camera) and asynchronously transmit that video data to a broadcast server system for streaming to client computing devices in a similar way as described herein with respect to audio.

Figure 9:
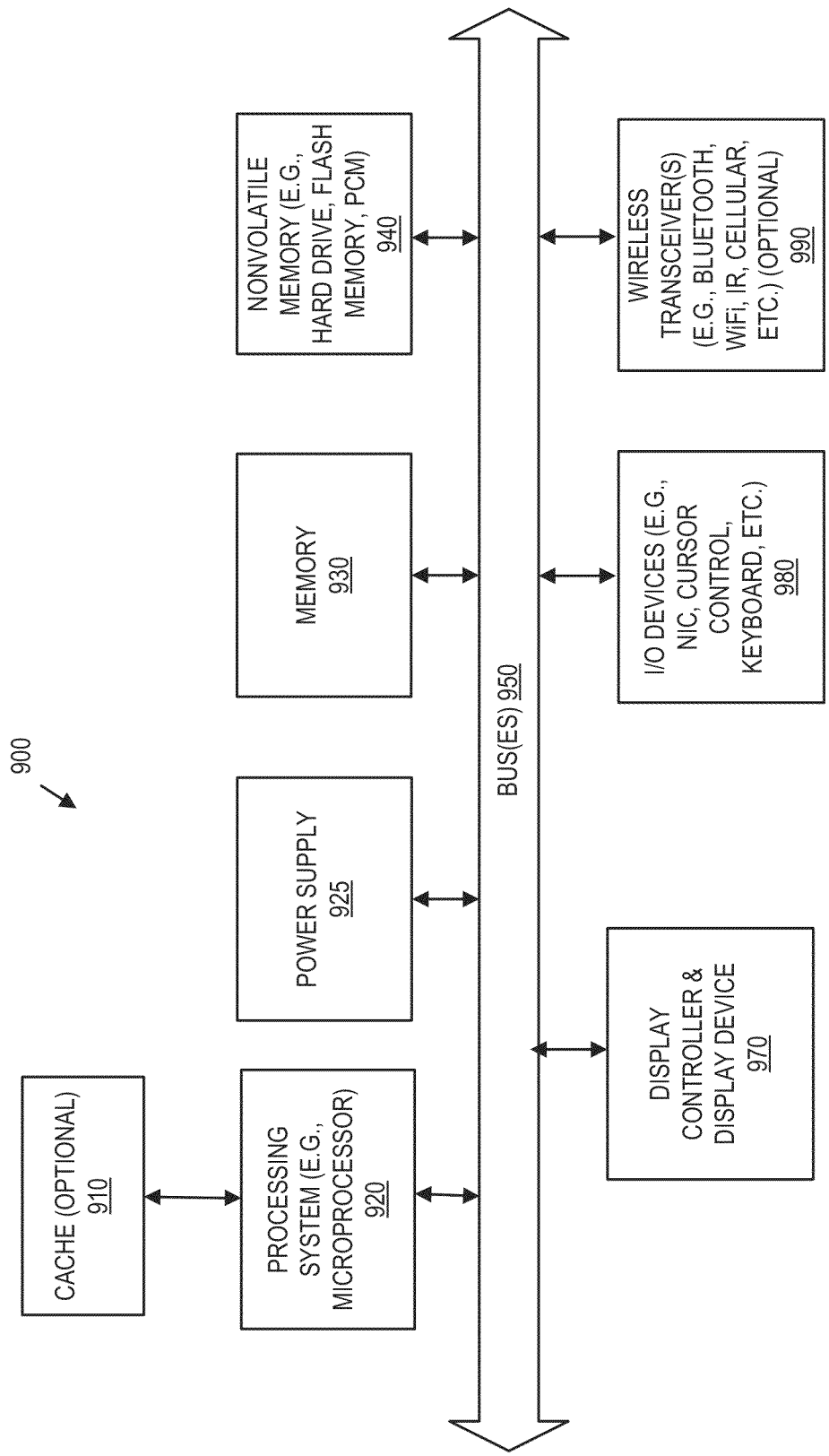
FIG. 9 is a block diagram illustrating an exemplary computing device that may be used in accordance with embodiments of the invention.

FIG. 9 is a block diagram illustrating an exemplary computing device that may be used in accordance with embodiments of the invention. As illustrated in FIG. 9, the computing device 900, which is a form of a data processing system, includes the bus(es) 950 which is coupled with the processing system 920, power supply 925, memory 930, and the nonvolatile memory 940 (e.g., a hard drive, flash memory, Phase-Change Memory (PCM), etc.). The bus(es) 950 may be connected to each other through various bridges, controllers, and/or adapters as is well known in the art. The processing system 920 may retrieve instruction(s) from the memory 930 and/or the nonvolatile memory 940, and execute the instructions to perform operations described herein. The bus 950 interconnects the above components together and also interconnects those components to the display controller & display device 970, Input/Output devices 980 (e.g., NIC (Network Interface Card), a cursor control (e.g., mouse, touchscreen, touchpad, etc.), a keyboard, etc.), and the wireless transceiver(s) 990 (e.g., Bluetooth, WiFi, Infrared, etc.). One or more of the components of the computing device 900 may be optional (e.g., the display controller and display device 970, I/O devices 980, the wireless transceiver(s) 990, etc.). In one embodiment, the handheld device 110, the storage subsystem 150, the application server 160, and/or the client computing devices 190A-N can take the form of the computing device 900.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., handheld devices, servers). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory computer-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An audio streaming system, comprising:
a handheld computing device that is configured to perform the following on a periodic basis when in an asynchronous streaming mode for a streaming audio session:
receive and buffer audio data, wherein the buffered audio data includes a plurality of contiguous audio samples;

after a predefined amount of contiguous audio samples have been buffered, perform the following:

assign an index for the predefined amount of contiguous audio samples, and asynchronously transmit that predefined amount of contiguous audio samples and the assigned index for that predefined amount of contiguous audio samples to a storage subsystem of a broadcast server system, wherein the storage subsystem is located remotely from the handheld computing device; and upon a determination that the predefined amount of contiguous audio samples and the corresponding assigned index have been received by the storage subsystem, transmit a notification message to an application server of the broadcast server system that includes the assigned index and indicates that the predefined amount of contiguous audio samples is stored on the storage subsystem of the broadcast server, wherein the notification message is configured to cause the application server to fetch the predefined amount of contiguous audio samples according to the index included in the notification message and process those audio samples for broadcasting to a plurality of client computing devices.

2. The audio streaming system of claim 1, wherein the handheld computing device is further configured to be connected to a soundboard and receive the audio data through the connection to the soundboard.

3. The audio streaming system of claim 1, wherein the handheld computing device is configured to receive the audio data via a microphone integrated into the handheld computing device or attached to the handheld computing device.

4. The audio streaming system of claim 1, wherein the handheld computing device is configured to transmit the predefined amount of contiguous audio samples and the assigned index for that predefined amount of contiguous audio samples to the storage subsystem using a Hypertext Transfer Protocol (HTTP) POST request.

5. The audio streaming system of claim 1, wherein the contiguous audio samples are received from a live event or performance.

6. The audio streaming system of claim 1, wherein prior to the handheld computing device transmitting the predefined amount of contiguous audio samples to the storage subsystem, the handheld computing device is configured to encode the predefined amount of contiguous audio samples into a compressed format.

7. The audio streaming system of claim 6, wherein the handheld computing device is further configured to adapt the encoding of future contiguous audio samples received during the streaming audio session based on current network conditions.

8. The audio streaming system of claim 1, further comprising the application server that is configured to perform the following upon receipt of the notification message:

fetch the predefined amount of contiguous audio samples according to the index in the notification message;

decode the contiguous audio samples;

process the decoded audio samples including encoding the contiguous audio samples into a plurality of bit rates;

upload the processed audio samples to the storage subsystem;

create or update one or more streaming audio playlists for the streaming audio session that identifies a location of the processed audio samples and an order in which to play those processed audio samples, wherein the one or more streaming audio playlists are configured to be used by the client computing devices to download the processed audio samples for playback.

9. A method for asynchronously streaming audio from a handheld computing device, comprising the steps of:

receiving, at the handheld computing device, audio data captured from a soundboard coupled with the handheld computing device or from a microphone, wherein the received audio data includes a plurality of contiguous audio samples;

appending the plurality of contiguous audio samples into a buffer on the handheld computing device;

responsive to determining that the amount of plurality of contiguous audio samples in the buffer reaches a predetermined threshold, the handheld computing device performing the following:

assigning an index to that amount of contiguous audio samples, and asynchronously transmitting that amount of contiguous audio samples and index to a storage subsystem of a broadcast server system; and responsive to the handheld computing device determining that the amount of contiguous audio samples and index have been received by the storage subsystem, the handheld computing device transmitting a notification message to an application server of the broadcast server system that includes the index and indicates that the amount of contiguous audio samples is stored on the storage subsystem of the broadcast server system, wherein the notification message is configured to cause the application server to fetch the amount of contiguous audio samples according to the index and process those contiguous audio samples for broadcasting to a plurality of client computing devices.

10. The method of claim 9, wherein the amount of contiguous audio samples and index are transmitted to the storage subsystem of the broadcast server system using a Hypertext Transfer Protocol (HTTP) POST request.

11. The method of claim 9, wherein the steps are performed on a periodic basis when the handheld computing device is in an asynchronous streaming mode.

12. The method of claim 9, wherein the contiguous audio samples are part of a live event or performance.

13. The method of claim 9, wherein the notification message is transmitted to the application server of the broadcast server system using a Hypertext Transfer Protocol (HTTP) POST request.

14. The method of claim 9, wherein prior to transmitting that amount of contiguous audio samples and index to the storage subsystem of the broadcast server system, the handheld computing device encoding that amount of contiguous audio samples in a compressed format.

15. The method of claim 14, wherein the handheld computing device further performs the following step:

adjusting the encoding of future contiguous audio samples based on current network conditions.

16. A method for streaming audio transmitted by a handheld computing device during an streaming audio session, comprising the steps of:

receiving, from a handheld computing device, a notification message that includes an index value and indicates that an audio segment corresponding to that index value is stored in a storage subsystem, wherein the audio segment includes a plurality of contiguous audio samples that have been captured and transmitted to the storage subsystem by the handheld computing device;

in response to receiving the notification message, performing the following steps:
fetching the audio segment from the storage subsystem according to the index value;
processing the fetched audio segment including,
decoding the fetched audio segment, and
encoding the audio segment into a plurality of encoded audio segments encoded in a plurality of bit rates respectively;
transmitting the plurality of encoded audio segments to the storage subsystem;
creating or updating a plurality of streaming audio playlists for the plurality of encoded audio segments respectively, wherein each streaming audio playlist identifies at least a location of the corresponding encoded audio segment and an order in which to play that encoded audio segment; and
transmitting the plurality of streaming audio playlists to the storage subsystem.

17. The method of claim 16, further comprising providing an interface for listeners to locate and download at least one of the streaming audio playlists for playback of the corresponding audio segment.

18. The method of claim 16, wherein processing the fetched audio segment further includes adjusting a level of the decoded audio segment.

19. The method of claim 16, wherein the steps are performed periodically during the streaming audio session while receiving notification messages from the handheld computing device that indicate that audio segments have been uploaded to the storage subsystem.

20. The method of claim 16, wherein the streaming audio session is audio from a live event or performance.

* * * * *